Figure 3:
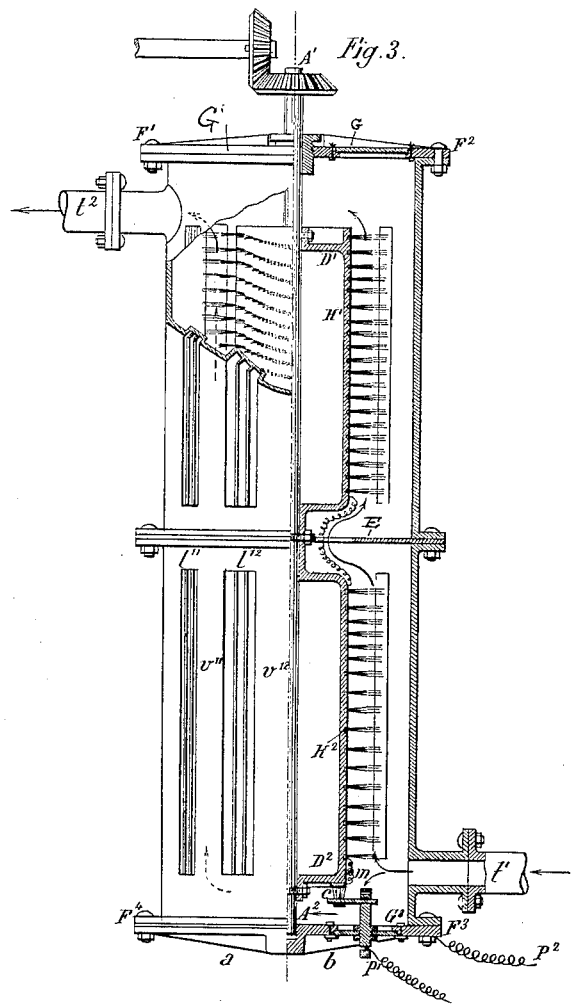

(No Model.) 2 Sheets—Sheet 1.
M. OTTO.
APPARATUS FOR PRODUCING OZONE.
No. 599,455. Patented Feb. 22, 1898.
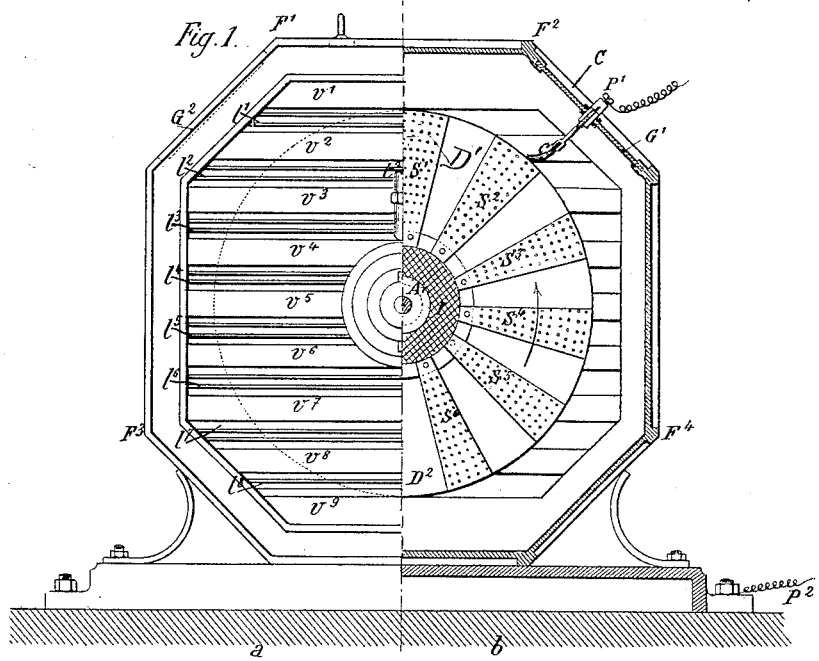
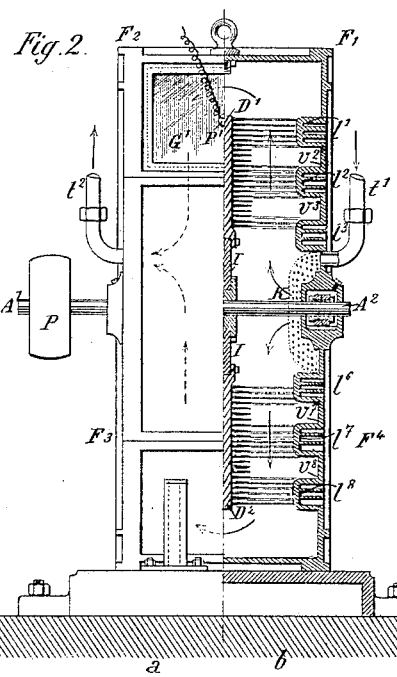
Witnesses
H. L. Beil
Otto Munk
Inventor
Marius Otto
By Richards
Attys
THE NORRIS PETERS CO., PHOTO-LITHO., WASHINGTON, D. C.

(No Model.) 2 Sheets—Sheet 2.

M. OTTO.
APPARATUS FOR PRODUCING OZONE.

No. 599,455. Patented Feb. 22, 1898.

Witnesses
H L Beil

Inventor
Marius Otto
By
Attys

UNITED STATES PATENT OFFICE.

MARIUS OTTO, OF PARIS, FRANCE.

APPARATUS FOR PRODUCING OZONE.

SPECIFICATION forming part of Letters Patent No. 599,455, dated February 22, 1898.

Application filed June 15, 1897. Serial No. 640,889. (No model.)

*To all whom it may concern:*

Be it known that I, MARIUS OTTO, a citizen of the French Republic, residing at Paris, France, have invented certain new and useful Improvements in Apparatus for the Production of Ozone, of which the following is a full, clear, and exact specification.

In the majority of apparatus heretofore proposed for the production of ozone by means of high-tension currents, in order to avoid dangerous short circuits, it is necessary to separate by means of a dielectric matter—such as glass, mica, &c.—the two electrodes between which the discharge is produced and the gaseous matter to be ozonized circulates. Dielectric materials often cause accidents, especially when glass is used. If this is not used, and unless currents of very high tension and very slight intensity are employed—such, for instance, as are produced by an electrostatic machine—arcs will soon form between the electrodes and make them useless. The formation of these arcs is especially due to the diminished resistance of the gaseous mass, owing to its becoming heated.

I have discovered and devised a series of apparatus in which for the production of ozone currents of high tension are used, produced by means of alternators and industrial transformers without any danger of short circuits occurring between the electrodes. These apparatus have the following essential features: First, the electrodes (half of them, at least) are movable; second, only such materials are used in their construction as possess all guarantees for resistance and solidity required in apparatus which is intended for long industrial use; third, the electric discharge is produced directly in the air or the oxygen between metallic parts reduced to different potentials without having any solid dielectric material interposed between them.

The movableness of the electrodes (or of at least half of them) is for the purpose of letting the silent discharge take place only during a very short time, so as to avoid all heating of the electrified gaseous mass.

Supposing, for instance, two electrodes connected, respectively, with two poles of a source of high potential and placed at such a distance that no silent discharge can take place between them, if we bring them sufficiently near to each other the discharge will be produced, and if we then increase the distance gradually the discharge will be extinguished at the moment when the resistance offered by the way it has to travel becomes too great to be overcome by the difference of potential existing between the electrodes. It will easily be understood that these successive phenomena can be produced by different dispositions.

Figure 4:
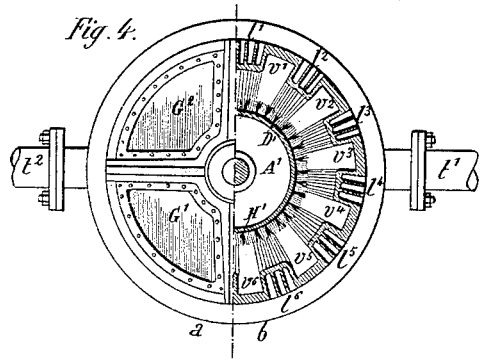

The results of my experiments have induced me to stop practically at the two following types of ozonizators with movable electrodes, illustrated, respectively, by Figures 1, 2, 3, and 4 of the accompanying drawings, Figs. 1 and 2 being views a quarter turned from each other partly in section and partly in elevation. Fig. 3 is an elevation, partly in section, of a modification. Fig. 4 is a top view of Fig. 3.

The apparatus, shown partly in front elevation $a$ and in longitudinal section along the axle $b$ in Fig. 1, and partly in side elevation $a$ and cross-section along the axle $b$ in Fig. 2, consists of a strong cast-iron frame of octagonal shape $F'$ $F^2$ $F^3$ $F^4$, and its side walls are provided with alternating parts projecting at $V'$ $V^2$ $V^3$, &c., and reëntering at $l'$ $l^2$ $l^3$, &c., the latter being fitted with small wings like those in radiators. Inside the frame $F'$ $F^2$ $F^3$ $F^4$ and mounted on an axle $A'$ $A^2$ is a metallic disk $D'$ $D^2$, moving by means of an insulating circle I and bearing a series of sectors which are armed with points or fitted with metallic brushes of aluminium or platinum $S'$ $S^2$ $S^3$, &c., the rotatory motion being imparted to the disk by means of a pulley fixed on the axle $A'$ $A^2$.

Two glass plates $G'$ $G^2$ permit of looking into the inside of the apparatus. In the center of the plate $G'$ is a hole through which passes a metallic shaft provided at one end with a brush $c$, conducting the current to the disk $D'$ $D^2$, and at the other end with a terminal post $p'$. On the latter is fixed a conductor ending at one of the poles of a high-tension transformer. The other pole communicates with the metallic frame through a conductor $p^2$, fixed to one of the fastening-bolts of the apparatus.

The gaseous mass of air or oxygen to be ozonized is fed into the apparatus through the pipe system $t'$, is evenly distributed by a spraying-rose K, follows the direction indicated by the arrows, and escapes through the pipe system $t^2$ after having been acted upon by the silent discharge.

When the apparatus is in operation, it is easy to see that in consequence of the unequal distances between the sectors $S'$ $S^2$ $S^3$, &c., of the parts $L'$ $L^2$ $L^3$, &c., and $V'$ $V^2$ $V^3$, &c., of the cast-iron frame the discharge is produced and extinguished at very short intervals and passes constantly from one point to another on the sectors $S'$ $S^2$ $S^3$, &c.

The movable part of the apparatus, shown partly in elevation $a$, partly in longitudinal section $b$ in Fig. 3, and partly in plan $a$, partly in horizontal section $b$ in Fig. 4, is formed by two or more metallic helices moving inside a cast-iron cylinder, provided like the frame of the preceding apparatus with alternately-projecting parts $L'$ $L^2$ $L^3$, &c., and reëntering parts $V'$ $V^2$ $V^3$, &c.

The cylinder $F'$ $F^2$ $F^3$ $F^4$ is closed by glass plates $G'$ $G^2$, &c., at each end. Each of the helices $H'$ $H^2$ is formed by a series of conducting-points of platinum or aluminium, &c., held in place by two wires twisted together and fixed on a cylinder $D'$ $D^2$, made of porcelain or any other suitable insulating material.

A brush $c$, rubbing over a metallic circle $m$, fixed on the basis of one of the porcelain cylinders, sends the current to the metallic points of the helices. This brush is mounted on a shaft having a terminal post $p'$ and protruding through one of the glass plates which close the cylinder.

One of the poles of a high-tension transformer is connected to the terminal post $P'$. The other pole communicates directly with the cylinder $F'$ $F^2$ $F^3$ $F^4$ by a wire fixed on a bolt $P^2$.

The two helices $H'$ and $H^2$ are separated by a disk E, forming a contraction. The purpose of this disk is to control the velocity of the gaseous current in the various parts of the apparatus and to subject to the silent discharge as uniformly as possible the air or oxygen to be ozonized, delivered by the pipe system $t'$, and escaping by the pipe system $t^2$.

The axle $A'$ $A^2$, on which the helices are mounted, is provided with a gear by means of which a rotating motion can be imparted to said helices.

When the apparatus is in operation, the silent discharge is produced between the points forming the helix and the reëntering parts $l'$ $l^2$ $l^3$, &c., of the cylinder. The silent discharge goes on regularly, flashing and being extinguished at very short intervals, so as to prevent absolutely the formation of short circuits.

In apparatus with movable electrodes described above the distances between the movable parts and the fixed parts nearest thereto—i. e., the distance to be traveled by the electric discharge—varies with the potential. As an instance I will say that with eighteen thousand volts these distances must be about three centimeters. These apparatus are generally made of cast-iron; but any other material may be used instead—such as wood, sheet-iron, porcelain, &c. The main point, if a non-conducting body is used, is to cover it with metal at the point where the discharge is to take place.

In order to render the materials entering into the construction of my ozonizators proof against the action of the ozone, they can either be covered with a coat of rust-proof material, platinum, gold, &c., or protected by a suitable varnish, enamel, or the like.

The apparatus invented by me and illustrated by Figs. 1, 2, 3, and 4 can be utilized not only for the production of ozone, but also for all operations, combinations, or decompositions of gases, which necessitate the intervention of electric discharges—for instance, for combining azote and acetylene for producing hydrocyanic acid. The apparatus of Figs. 1 and 2 or 3 and 4 can of course be mounted by groups, according to tension or quantity.

I claim—

The herein-described apparatus, comprising a shell or casing, electrodes therein one being movable in relation to the other and adapted to produce and extinguish gradually the discharges at short intervals, means for moving the movable electrode, inlet and outlet openings and electrical connections with a high-tension transformer, substantially as described.

In witness whereof I have hereunto set my hand in presence of two witnesses.

MARIUS OTTO.

Witnesses:
EMIL BERT,
A. MORTIER.